United States Patent [19]

Stackman et al.

[11] 4,071,499

[45] Jan. 31, 1978

[54] HIGH TEMPERATURE POLYESTER RESINS FROM 4,4′-BIS(P-HYDROXYPHENOXY)DIPHENYL ETHER AND TEREPHTHALIC ACID

[75] Inventors: Robert W. Stackman, Morristown; Anthony B. Conciatori, Chatham, both of N.J.

[73] Assignee: Celanese Corporation, New York, N.Y.

[21] Appl. No.: 713,722

[22] Filed: Aug. 12, 1976

[51] Int. Cl.$^2$ .............................................. C08G 63/18
[52] U.S. Cl. .......................... 260/47 C; 260/30.8 DS; 260/32.6 R; 260/33.8 R; 428/480
[58] Field of Search ...................... 260/47 C

[56] References Cited

U.S. PATENT DOCUMENTS

| | | | |
|---|---|---|---|
| 3,557,055 | 1/1971 | Bonnard et al. | 260/47 |
| 3,763,210 | 10/1973 | Heath et al. | 260/465 F |
| 3,956,240 | 5/1976 | Dahl et al. | 260/47 C |

*Primary Examiner*—Lester L. Lee

[57] ABSTRACT

This invention provides high temperature performance polyester resins which contain polyphenyl ether blocks as recurring structural units. The polyester resins are melt stable at temperatures up to about 400° C.

6 Claims, No Drawings

HIGH TEMPERATURE POLYESTER RESINS FROM 4,4'-BIS(P-HYDROXYPHENOXY)DIPHENYL ETHER AND TEREPHTHALIC ACID

BACKGROUND OF THE INVENTION

There has been continuing effort to develop new types of high performance polymeric compositions which exhibit high heat and oxidation resistance and improved mechanical properties.

U.S. Pat. No. 3,264,536 describes a novel type of solid thermoplastic polyarylene polyether which is adapted for incorporation in an electric capacitor as a dielectric. The preferred linear thermoplastic polyarylene polyethers are prepared in an essentially equimolar one-step reaction of a double-alkali salt of a dihydric phenol with a dihalobenzenoid compound in the presence of specific liquid organic sulfoxide or sulfone solvents under substantially anhydrous conditions.

U.S. Pat. No. 3,332,909 discloses a type of organic polymers which have ether oxygen atoms valently connecting together aromatic nuclei or residua or aromatic compounds:

wherein G is the residuum of a dihydric phenol, and G' is the residuum of a dibromo or diiodobenzenoid compound.

U.S. Pat. No. 3,375,297 provides novel linear thermoplastic polymers which are polyhydroxyethers having the formula:

wherein D is the residuum of a dihydric phenol, D' is a hydroxyl containing residuum of an epoxide, and $n$ represents the degree of polymerization and is at least 30 and is preferably 80 or more.

U.S. Pat. No. 3,516,966 describes a type of film and fiber forming copolyketone polymer consisting essentially of the recurring structural unit:

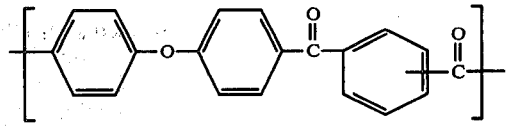

U.S. Pat. No. 3,809,682 provides an improved process for the manufacture of aromatic polyethers and polythioethers by treatment of the alkali salt of a divalent aromatic phenol or an aromatic dimercapto compound with an aromatic dihalogen compound in a polar solvent.

U.S. Pat. No. 3,678,006 discloses a new class of polyphenylene copolymers, tripolymers and quaterpolymers modified with an alkyl and/or aryl phenolic compound and/or aromatic amine curable to useful coating, bonding and molded resins with curing agents generally applicable to phenolic resins.

U.S. Pat. No. 3,886,120 and 3,886,121 describes a process for preparing polyarylenepolyether polymers of the formula:

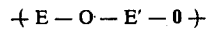

wherein E represents a residual divalent phenol group and E' represents a residual benzenoid group having a weak electron withdrawing group in at least one of the positions ortho or para to the valence bonds.

The high performance polymers known in the prior art generally undergo thermal changes at a molding temperature higher than 300° C. Polyaromatic polymers often become discolored under high temperature melt conditions, so that transparency is reduced and light-transmittance of the polymeric mass is lowered. Further, high performance polymers which exhibit high temperature stability are deficient with respect to other desirable properties such as flexibility and solubility in solvents.

Accordingly, it is an object of this invention to provide a novel class of high performance polymers which exhibit improved melt stability, flexibility, transparency and appearance.

It is another object of this invention to provide polyester resins which are thermally stable at temperatures up to about 400° C, and which are solvent soluble.

It is a further object of this invention to provide polyester resins which contain polyphenyl ether blocks, and which can be melt extruded or molded at temperatures between about 350° and 400° C.

Other objects and advantages of the invention shall become apparent from the following description and examples.

DESCRIPTION OF THE INVENTION

One or more objects of the present invention are accomplished by the provision of a polyester resin composition which consists essentially of the recurring structural unit:

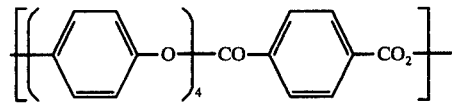

The preferred polyester resin compositions of the present invention have an average molecular weight in the range between 1,000 and 50,000. The polyester resin compositions nominally have an inherent viscosity between about 0.3 to 1.0. Inherent viscosity is calculated according to the formula:

$$I.V. = \frac{\text{natural log} \frac{\text{Viscosity of solution}}{\text{Viscosity of solvent}}}{C}$$

where C is the concentration expressed in grams per 100 milliters of solution.

The preferred polyester resin compositions are characterized by a melting point range which is below about 350° C. This is an important feature for purposes of melt extrustion and molding applications.

Structurally the polyester resin compositions correspond to the condensation residues of 4,4'-bis(p-hydroxyphenoxy)diphenyl ether and terephthalic acid. The polyester resin compositions, for example, are conveniently prepared by reacting an alkali metal salt of 4,4'-bis(p-hydroxyphenoxy)diphenyl ether with terephthaloyl halide.

The 4,4'-bis(p-hydroxyphenoxy)diphenyl ether condensation reactant can be synthesized in the following manner:

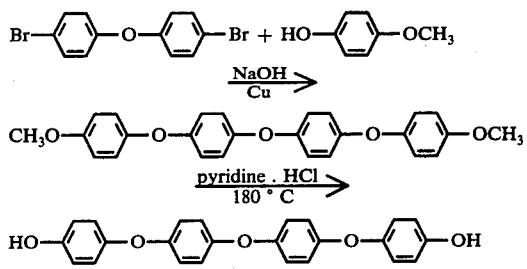

The polyester resin compositions are prepared by condensing the 4,4'-bis(p-hydroxyphenoxy)diphenyl ether reactant with terephthalic acid or acid halide on an approximately equimolar basis. If the equimolar proportions of reactants are varied more than about 5 percent, the molecular weight of the resultant polyester resin product is reduced.

The condensation polymerization reaction preferably is conducted in a reaction medium such as methylene chloride. The polymerization reaction temperature can vary in the range between about 100° and 250° C. The reflux temperature of the solvent medium is normally a suitable temperature for the polymerization reaction.

The polyester product of the polymerization reaction is recovered in any convenient manner, such as by precipitation induced by cooling or by adding a nonsolvent for the polyester product or by stripping the solvent at reduced pressures. Removal of salts and neutralization can be accomplished by appropriate aqueous wash procedures.

The present invention polyester resin compositions have excellent melt stability and can be melt extruded at a temperature of 350° C without any evidence of decomposition. The polyester resin compositions form clear fibers which have good flexibility and mechanical strength.

A particularly advantageous property of the polyester resin compositions is their solubility in conventional polymer solvents such as methylene chloride, tetrachloroethylene, 1,1,2,2,-tetrachloroethane, dimethylsulfoxide, dimethylacetamide, and the like. Films and coatings are readily castable from a solution medium.

The present invention resin compositions are also amenable to powder coating techniques. Metal objects can be coated rapidly and economically with a high capacity powder coating operation.

The following examples are further illustrative of the present invention. The reactants and other specific ingredients are presented as being typical, and various modifications can be derived in view of the foregoing disclosure within the scope of the invention.

EXAMPLE I

Preparation Of 4,4'-Bis(p-hydroxyphenoxy)diphenyl Ether

In a 2000 ml three-necked flask equipped with stirrer, reflux condenser, nitrogen inlet and Dean-Stark trap, is placed 248 grams (2.0 mole) p-methoxyphenyl, 200 grams (0.01 mole) bis(p-bromophenyl) ether, 80 grams (2.0 moles) sodium hydroxide and 16 grams copper powder. The mixture is heated to 200° C and water is removed by distillation and collected. When no more water is evident, 3 grams cuprous chloride ($Cu_2Cl_2$) is added and the temperature is increased to 225° C and this temperature maintained for 6 hours. At the end of this period the reaction mixture is poured into water and a brown precipitate is recovered and washed several times with acetone. The solid is recrystallized from toluene to yield 82 grams (21%) of a white crystalline solid M.P. 165°–170° C [4,4'-bis(p-methoxyphenoxy)-diphenyl ether].

In a 3000 ml three-necked flask, equipped with stirrer, condenser, nitrogen inlet and thermometer is placed 82 grams (0.15 mole) 4,4'-bis(p-methoxyphenoxy)diphenyl ether and 210 grams anhydrous pyridine hydrochloride. The mixture is heated to 220°–230° C for 2 hours then is poured into water to precipitate a white solid which is washed several times with water then dried in a vacuum oven. A yield of 56.5 grams (75%) is obtained.

EXAMPLE II

Preparation Of A Polyester Containing Polyphenyl Ether Blocks

A one liter flask equipped with a stirrer, reflux condensation, addition funnel and nitrogen inlet is charged with 38.5 grams (0.1 mole) of 4,4'-bis(p-hydroxyphenoxy)diphenyl ether, 400 ml of methylene chloride and 25.5 grams (0.25 mole) of triethylamine. A white slurry of phenol/amine salt is formed.

The slow addition of a solution of 20.5 grams (0.1 mole) of terephthaloyl chloride in 150 ml of methylene chloride to the reaction mixture yields a viscous solution. The solution is washed with portions of 1% aqueous hydrochloric acid, and finally with several portions of water.

The solution thus prepared is added to a rapidly stirred acetone medium. Solid polyester resin separates in the form of a white fibrous precipitate.

The polyester resin has an I.V. of 0.95 dl/g (1% in tetrachloroethylene), and melts over a range of 260°–315° C. The TGA indicates no major decomposition below 380° C in air.

Clear transparent films of the polyester resin can be cast from tetrachloroethylene solutions. The films are non-burning in air, and form heavy chars when contacted with flame.

The polyester resin can be melt extruded at 310° C to provide a clear strand, and the polyester resin can be compression molded at 250° C and 15,000 psi.

A similar polyester resin prepared with hydroquinone does not melt at a temperature below 400° C. A polyester resin prepared with oxydiphenol does not melt or flow below the decomposition temperature of 360° C.

What is claimed is:

1. A polyester resin composition which consists essentially of the recurring structural unit:

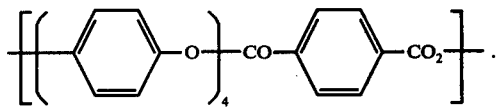

2. A polyester resin in accordance with claim 1 which consists essentially of the condensation residues of 4,4'-bis(p-hydroxyphenoxy)diphenyl ether and terephthalic acid, and has a melting range below about 350° C.

3. A polyester resin in accordance with claim 2 which exhibits melt stability at temperatures in the range between about 350° and 400° C.

4. A polyester resin in accordance with claim 2 in the form a shaped molded article.

5. A polyester resin in accordance with claim 2 in the form of a fiber.

6. A polyester resin in accordance with claim 2 in the form of a film.

* * * * *